US010015389B2

(12) United States Patent
Lu et al.

(10) Patent No.: US 10,015,389 B2
(45) Date of Patent: Jul. 3, 2018

(54) IMAGE SENSOR WITH ASYMMETRIC-MICROLENS PHASE-DETECTION AUTO-FOCUS (PDAF) DETECTORS, ASSOCIATED PDAF IMAGING SYSTEM, AND ASSOCIATED METHOD

(71) Applicant: OmniVision Technologies, Inc., Santa Clara, CA (US)

(72) Inventors: Chen-Wei Lu, San Jose, CA (US); Yin Qian, Milpitas, CA (US); Dyson H. Tai, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/273,338

(22) Filed: Sep. 22, 2016

(65) Prior Publication Data

US 2018/0084185 A1    Mar. 22, 2018

(51) Int. Cl.
*H04N 5/232*    (2006.01)
*G02B 3/00*    (2006.01)
(Continued)

(52) U.S. Cl.
CPC ....... *H04N 5/23212* (2013.01); *G02B 3/0018* (2013.01); *G02B 3/0056* (2013.01);
(Continued)

(58) Field of Classification Search
CPC ............. H04N 5/23212; H04N 5/2253; H04N 5/2254; G03B 13/36; G02B 3/0018; G02B 7/36; G02B 3/0056; G02B 5/20
See application file for complete search history.

(56) References Cited

U.S. PATENT DOCUMENTS

2006/0170810 A1*   8/2006  Kim ................... G02B 3/0018
                                                              348/340
2006/0273239 A1*  12/2006  McGrath ........... H01L 27/14627
                                                              250/208.1
(Continued)

FOREIGN PATENT DOCUMENTS

JP          2015-153975 A       8/2015

OTHER PUBLICATIONS

Cox C. et al., Microlens formation using heavily dyed photoresist in a single step, Copyright 2006 Society of Photo-Optical Instrumentation Engineers, 7 pages.
(Continued)

*Primary Examiner* — Timothy J Henn
(74) *Attorney, Agent, or Firm* — Lathrop Gage LLP

(57) ABSTRACT

A PDAF imaging system includes an image sensor and an image data processing unit. The image sensor has an asymmetric-microlens PDAF detector that includes: (a) a plurality of pixels forming a sub-array having at least two rows and two columns, and (b) a microlens located above each of the plurality of pixels and being rotationally asymmetric about an axis perpendicular to the sub-array. The axis intersects a local extremum of a top surface of the microlens. The image data processing unit is capable of receiving electrical signals from each of the plurality of pixels and generating a PDAF signal from the received electrical signals. A method for forming a gull-wing microlens includes forming, on a substrate, a plate having a hole therein. The method also includes reflowing the plate.

10 Claims, 16 Drawing Sheets

(51) Int. Cl.
  *G02B 5/20* (2006.01)
  *G02B 7/36* (2006.01)
  *G03B 13/36* (2006.01)
  *H04N 5/225* (2006.01)

(52) U.S. Cl.
  CPC ............... *G02B 5/20* (2013.01); *G02B 7/36* (2013.01); *G03B 13/36* (2013.01); *H04N 5/2253* (2013.01); *H04N 5/2254* (2013.01)

(56) References Cited

U.S. PATENT DOCUMENTS

| | | | | |
|---|---|---|---|---|
| 2007/0014019 | A1* | 1/2007 | Mouli | G02B 3/0018 359/619 |
| 2007/0181923 | A1* | 8/2007 | Tanaka | H01L 27/14627 257/294 |
| 2008/0090182 | A1* | 4/2008 | Suzuki | G02B 3/0018 430/321 |
| 2008/0151378 | A1 | 6/2008 | Kim | |
| 2009/0174945 | A1* | 7/2009 | Lin | B29D 11/00365 359/619 |
| 2010/0045849 | A1* | 2/2010 | Yamasaki | G03B 3/10 348/349 |
| 2013/0341493 | A1* | 12/2013 | Ando | G01C 3/32 250/208.1 |
| 2014/0055661 | A1* | 2/2014 | Imamura | A61B 1/041 348/342 |
| 2016/0071896 | A1* | 3/2016 | Kawabata | H01L 27/14627 348/294 |
| 2016/0073077 | A1* | 3/2016 | Kurahashi | H04N 9/045 348/272 |
| 2016/0178913 | A1* | 6/2016 | Endoh | G02B 5/0284 359/627 |
| 2016/0181309 | A1* | 6/2016 | Uehira | H01L 27/14629 257/432 |
| 2016/0233259 | A1* | 8/2016 | Sekine | H01L 27/14627 |
| 2016/0334621 | A1* | 11/2016 | Kawabata | G02B 27/0012 |
| 2017/0041525 | A1* | 2/2017 | Liu | H04N 5/23212 |
| 2017/0077164 | A1* | 3/2017 | Kawabata | H01L 27/14627 |
| 2017/0104020 | A1* | 4/2017 | Lee | H01L 27/1463 |
| 2017/0338258 | A1* | 11/2017 | Kim | H01L 27/14645 |
| 2017/0347042 | A1* | 11/2017 | Borthakur | H04N 5/355 |

OTHER PUBLICATIONS

Krivoshapko, S.N., et al. Classification of Cyclic Surfaces and Geometrical Research of Canal Surfaces, IJRRAS 12 (3) Sep. 2012, pp. 360-374.
Wei et al., Real-time Observation for the Formation of Microlens Arrays Fabricated Using Thermal Reflow Process, Tamkang Journal of Science and Engineering, vol. 7, No. 2, pp. 81-86 (2004), pp. 81-86.

* cited by examiner

IMAGE SENSOR WITH ASYMMETRIC-MICROLENS PHASE-DETECTION AUTO-FOCUS (PDAF) DETECTORS, ASSOCIATED PDAF IMAGING SYSTEM, AND ASSOCIATED METHOD

BACKGROUND

Many digital cameras have autofocus capability. Autofocus may be fully automatic such that the camera identifies objects in the scene and focuses on the objects. In some cases, the camera may even decide which objects are more important than other objects and subsequently focus on the more important objects. Alternatively, autofocus may utilize user input specifying which portion or portions of the scene are of interest. Based thereupon, the autofocus function identifies objects within the portion(s) of the scene, specified by the user, and focuses the camera on such objects.

To achieve market adoption, the autofocus function must be reliable and fast such that every time a user captures an image, the camera quickly brings the desired portion, or portions, of the scene into focus. Preferably, the autofocus function is sufficiently fast that the user does not notice any delay between pressing the trigger button and image capture. The autofocus is particularly important for cameras having no means for manual focus, such as compact digital cameras and camera phones.

Many digital cameras use contrast autofocus, wherein the autofocus function adjusts the imaging objective to maximize contrast in at least a portion of the scene, thus bringing that portion of the scene into focus. More recently, phase-detection autofocus has gained popularity because it is faster than contrast autofocus. Phase-detection autofocus directly measures the degree of misfocus by comparing light passing through one portion of the imaging objective, e.g., the left portion, with light passing through another portion of the imaging objective, e.g., the right portion. Some digital single-lens reflex cameras include a dedicated phase-detection sensor in addition to the image sensor that captures images.

However, this solution is not feasible for more compact and/or less expensive cameras. Therefore, camera manufacturers are developing image sensors with on-chip phase detection, i.e., image sensors with integrated phase detection capability via the inclusion of phase-detection auto-focus (PDAF) pixels in the image sensor's pixel array.

FIG. 1 illustrates one exemplary image sensor 101 with PDAF pixels in an exemplary use scenario 190. Image sensor 101 is implemented in a digital camera 180 for imaging a scene 150. Digital camera 180 is, for example, a camera phone or a compact digital camera. Digital camera 180 utilizes the on-chip phase detection capability of image sensor 101 to focus on scene 150. When focused, digital camera 180 utilizes image sensor 101 to capture a focused image 120, instead of a defocused image 130, of scene 150.

Image sensor 101 has a pixel array 200A that includes at least one PDAF pixel detector 200. FIG. 2 is a cross-sectional view of the PDAF pixel detector 200 of pixel array 200A. PDAF pixel detector 200 includes pixels 211 and 212 having a common color filter 221 and symmetric microlens 230. Symmetric microlens 230 has an optical axis 231 centered between pixels 211 and 212. Pixels 211 and 212 have respective top surfaces 211T and 212T. PDAF pixel detector 200 may be viewed as including phase-detection pixels 200L and 200R, which include pixel 211 and pixel 212 respectively.

FIGS. 3A-3C are cross-sectional views of a PDAF imaging system 300 in which a lens 310 forms an image 352 of an off-axis object 350 at an image plane 312 proximate pixel array 200A. Lens 310 has an optical axis 310A that intersects pixel array 200A at a pixel-array center 200AC. Image 352 is at a radial distance 352R from optical axis 310A and pixel-array center 200AC. Image plane 312 and lens 310 are separated by an image distance 312Z.

FIGS. 3A-3C illustrate propagation of a chief ray 351(0), an upper marginal ray 351(1), and a lower marginal ray 351(−1). In the cross-sectional view of FIGS. 3A-3C, pixel array 200A includes a column of PDAF pixel detector 200 of FIG. 2. In FIG. 3A, pixel array 200A is behind image plane 312. In FIG. 3B, pixel array 200A is coplanar with image plane 312. In FIG. 3C, pixel array 200A is in front of image plane 312.

FIGS. 3A-3C also include schematic pixel column responses 303 and 304, which represent response of, within a column of PDAF pixel detectors 200, (a) left pixels 211 and (b) right pixels 212, respectively.

In FIG. 3A, pixel array 200A is behind image plane 312 such that image 352 is out of focus at pixel array 200A. Pixel array 200A is at a distance 311A from lens 310, which corresponds to a misfocus distance $\Delta z = \Delta z_A > 0$ from image plane 312. Pixel column response 303A illustrates that a column of left phase-detection pixels detects one intensity peak 303A' corresponding to upper marginal ray 351(1). Pixel column response 304A illustrates that a column of right phase-detection pixels detects one intensity peak 304A' corresponding to lower marginal ray 351(−1). Intensity peak 304A' is closer to optical axis 310A than intensity peak 303A'. On pixel array 200A, intensity peaks 303A' and 304A' are separated by a distance $\Delta x = \Delta x_A > 0$.

In FIG. 3B, pixel array 200A is located at image plane 312 such that image 352 is in focus. Pixel array 200A is at a distance 311B from lens 310, which corresponds to a misfocus distance $\Delta z = \Delta z_B = 0$ from image plane 312. Pixel column response 303B illustrates that a column of left phase-detection pixels detects one intensity peak 303B' corresponding rays 351(−1,0,1) being incident on the same left-phase-detection pixel in the column. Pixel column response 304B illustrates that a column of right phase-detection pixels detects one intensity peak 304B' corresponding to rays 351(−1,0,1) being incident on the same right-phase-detection pixel in the column. On pixel array 200A, intensity peaks 303B' and 304B' are separated by a distance $\Delta x = \Delta x_B$, which is illustrated as equal to zero in FIG. 3B.

In FIG. 3C, pixel array 200A is in front of image plane 312 such that image 352 is out of focus at pixel array 200A. Pixel array 200A is at a distance 311C from lens 310, which corresponds to a misfocus distance $\Delta z = \Delta z_C < 0$ from image plane 312. Pixel column response 303C illustrates that a column of left phase-detection pixels detects one intensity peak 303C' corresponding to upper marginal ray 351(1). Pixel column response 304C illustrates that a column of right phase-detection pixels detects one intensity peak 304C' corresponding to lower marginal ray 351(−1). Intensity peak 304C' is further from optical axis 310A than is intensity peak 303C'. On pixel array 200A, intensity peaks 303C' and 304C' are separated by a distance $\Delta x = \Delta x_C < 0$.

One indicator of the accuracy of phase-detection auto-focusing by image sensor 101, hereinafter "PDAF accuracy," is how well the magnitude of $\Delta x$ indicates the magnitude of misfocus $\Delta z$. Specifically, with reference to FIG. 3B, zero misfocus (Δz=0) should correspond to Δx=0. Hence, the smaller the magnitude of Δx is when Δz=0, the higher the PDAF accuracy.

SUMMARY OF THE INVENTION

In a first embodiment, an image sensor with an asymmetric-microlens PDAF detector is disclosed. The asymmetric-microlens PDAF detector includes a plurality of pixels and a microlens. The plurality of pixels forms a sub-array having at least two rows and two columns. The microlens is located above each of the plurality of pixels, and is rotationally asymmetric about an axis perpendicular to the sub-array. The axis intersects a local extremum of a top surface of the microlens.

In a second embodiment, PDAF imaging system is disclosed. The PDAF imaging system includes an image sensor and an image data processing unit. The image sensor has an asymmetric-microlens PDAF detector that includes: (a) a plurality of pixels forming a sub-array having at least two rows and two columns, and (b) a microlens located above each of the plurality of pixels and being rotationally asymmetric about an axis perpendicular to the sub-array. The axis intersects a local extremum of a top surface of the microlens. The image data processing unit is capable of receiving electrical signals from each of the plurality of pixels and generating a PDAF signal from the received electrical signals.

In a third embodiment, a method for forming a gull-wing microlens is disclosed. The method includes forming, on a substrate, a plate having a hole therein. The method also includes reflowing the plate.

DETAILED DESCRIPTION OF THE EMBODIMENTS

Figure 4:
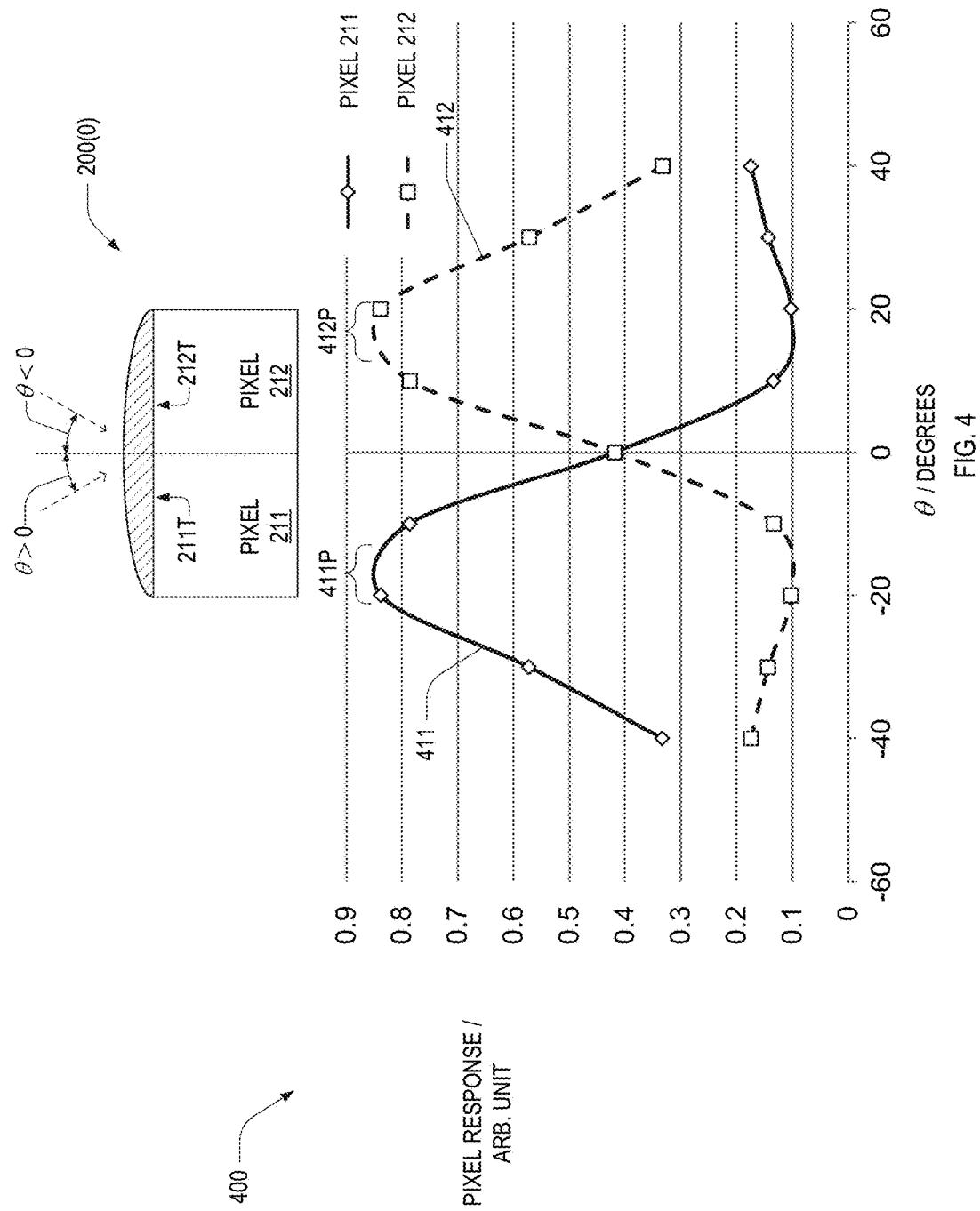
FIG. 4 is a schematic angular selectivity plot of the on-axis dual-diode PDAF pixel of FIG. 2.

Applicant has determined that PDAF accuracy depends on angular sensitivity of dual-diode PDAF pixels 200. FIG. 4 is a schematic angular selectivity plot 400 of an on-axis PDAF pixel detector 200(0), where on-axis refers to where optical axis 310A of lens 310 intersects pixel array 200A. Plot 400 includes pixel response 411 of left pixel 211 and pixel response 412 of right pixel 212 as a function of incident light angle θ. Since PDAF pixel detector 200(0) is aligned with optical axis 310A of lens 310, a chief ray incident thereon is normal to pixel top surfaces 212T and 211T. Pixel 212 has a peak response for positive incident light angles θ>0. Pixel 211 has a peak response for negative incident light angles θ<0. Pixel responses 411 and 412 are equal at relative angle $\theta_r = \theta_x = 0°$ and have respective peak regions 411P and 412P that are symmetric about $\theta_x$. Herein, relative angle $\theta_x$ denotes the minimum absolute value of $\theta_r$ at which pixel responses of a multi-diode PDAF pixel are equal. Applicant has determined that PDAF accuracy depends on angular sensitivity of dual-diode PDAF pixels, such as dual-diode PDAF pixels 200.

Figure 5:
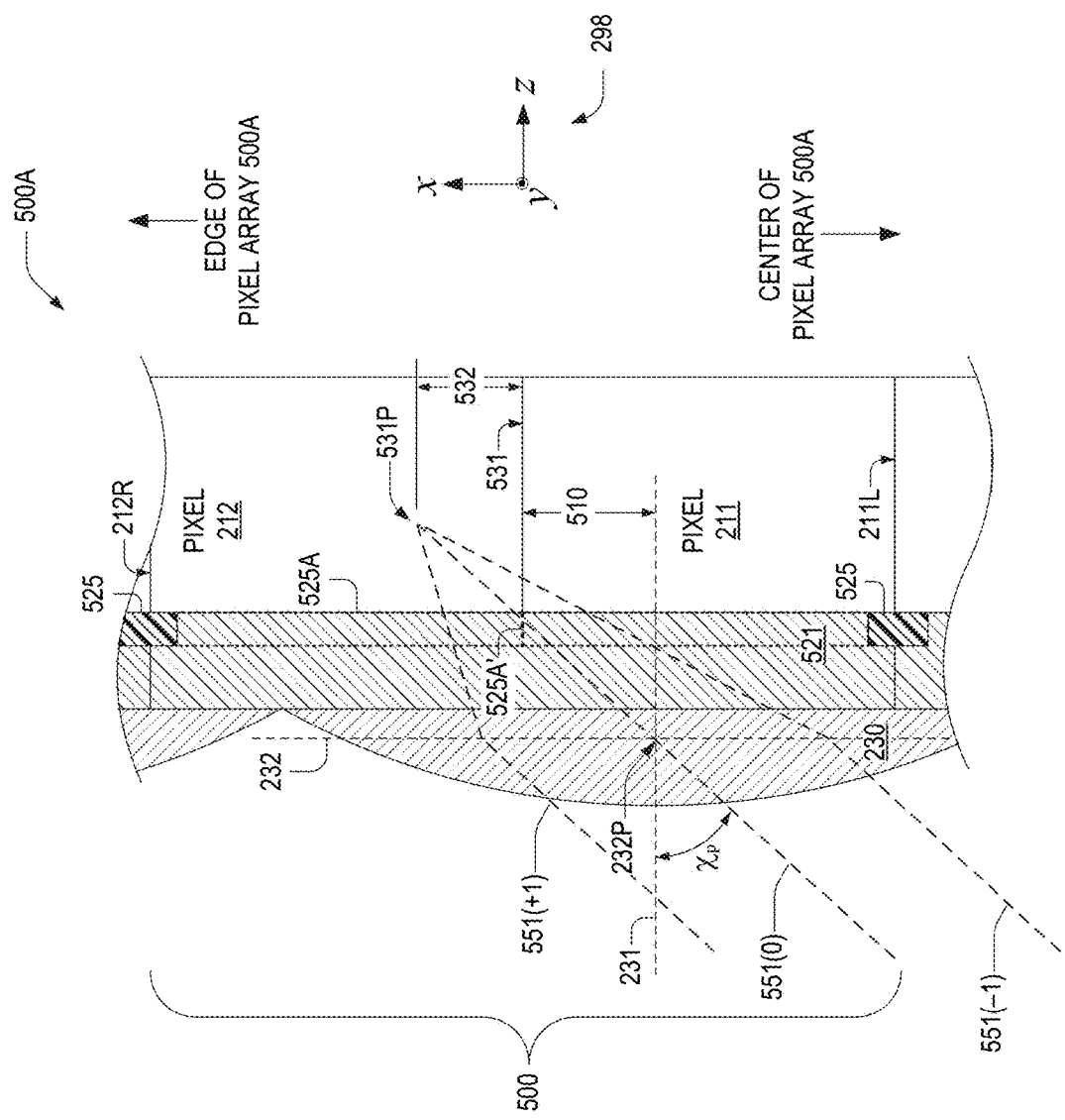
FIG. 5 is a cross-sectional view of an off-axis multi-diode PDAF pixel of a PDAF pixel array, in an embodiment.

FIG. 5 is a cross-sectional view of an PDAF detector 500 of a PDAF pixel array 500A. PDAF pixel array 500A is for example part of a CMOS image sensor. PDAF detector 500 is similar to PDAF pixel detector 200 except that symmetric microlens 230 is not aligned with pixels 211 and 212. Optical axis 231 is offset by a distance 510 from an interface 531 between pixel 211 and 212. Symmetric microlens 230 has a principal plane 232 that intersects optical axis 231 at a focus 232P. A color filter 521 is between microlens 230 and pixels 211, 212.

PDAF detector 500 is at a distance $r_p$ from the center of PDAF pixel array 500A, where $r_p$ is measured from the pixel array center to a location related to PDAF detector 500, such as optical axis 231 or interface 531. Distance $r_p$ is similar to distance 352R, FIG. 3. In an exemplary use scenario, PDAF pixel array 500A is at the image plane of lens 310 having an effective focal length f. Lens 310 transmits light at a plurality of chief-ray angles (CRAs) χ with respect to optical axis 310A, such that a "design" CRA $\chi_p$ of a chief ray incident on PDAF detector 500 depends on distance $r_p$. Design CRA $\chi_p$ may be related to distance $r_p$ according to $$\chi_p = \tan \frac{r_p}{d_{pa}},$$

hereinafter referred to as Equation (1). For example, Eq. (1) applies at least for a singlet lens.

Design CRA $\chi_p$ may be defined without reference to an imaging lens. For example, PDAF detector 500 may include an opaque structure 525 that has an aperture 525A therethrough. Aperture 525A has a center axis 525A'. Design CRA $\chi_p$ may correspond to the propagation angle of a chief ray transmitted by symmetric microlens 230 that passes through a specific position within aperture 525A, such as through center axis 525A'. Alternatively, design CRA $\chi_p$ may be an angle formed by optical axis 231 and a line connecting focus 232P and a point on center axis 525A'.

Alternatively, design CRA $\chi_p$ may be defined with reference to edges of pixels 211 and 212. Pixel 211 has a left edge 211L. Pixel 212 has a right edge 212R. Design CRA $\chi_p$ may be the propagation angle of a chief ray transmitted by symmetric microlens 230 that passes through a mid-point between edges 211L and 212R. Alternatively, design CRA $\chi_p$ may be an angle formed by optical axis 231 and a line connecting focus 232P and a mid-point between edges 211L and 212R.

Figure 1:
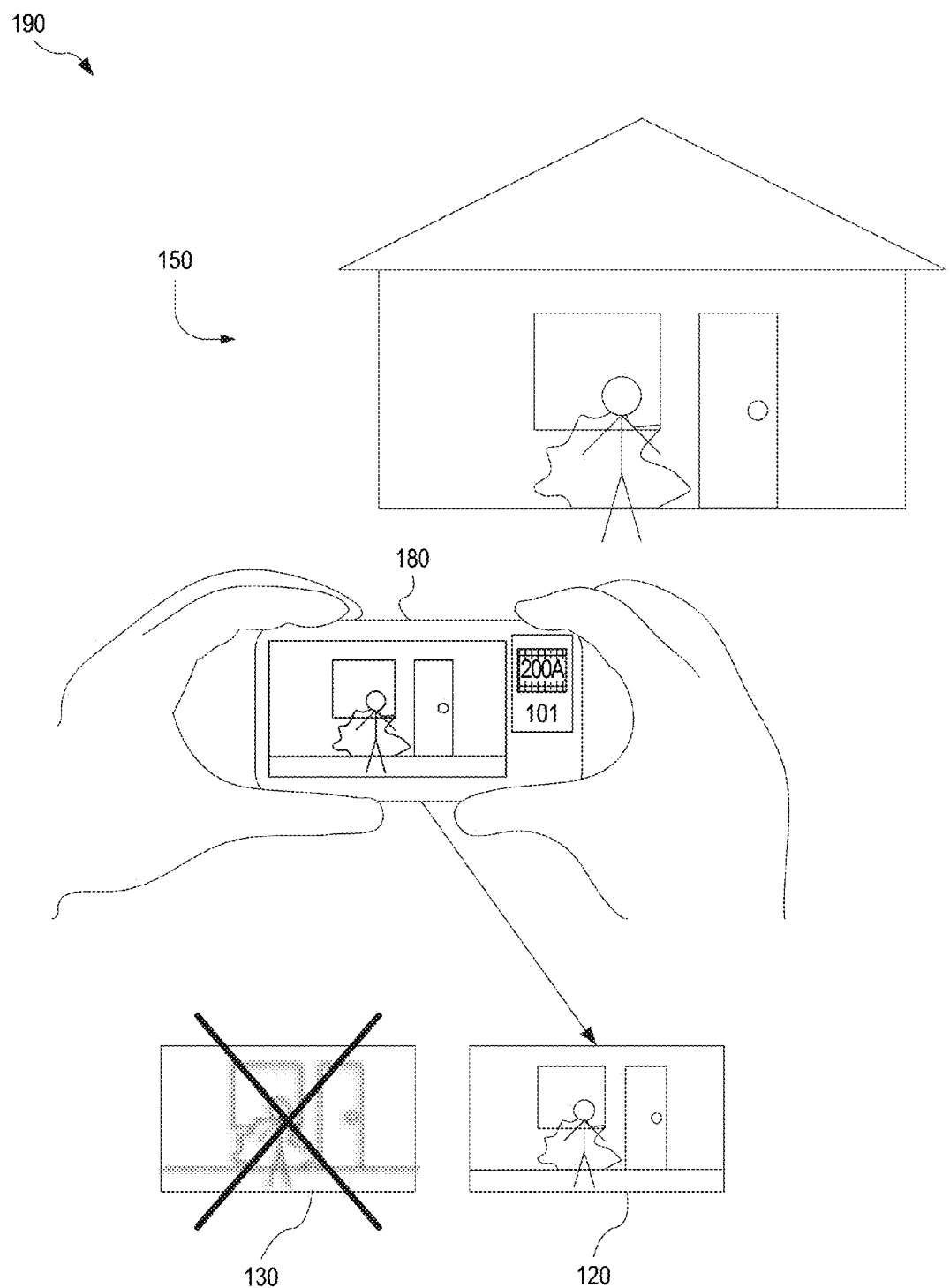
FIG. 1 illustrates a prior-art image sensor that includes a prior-art pixel array having PDAF pixels in a use scenario.
Figure 2:
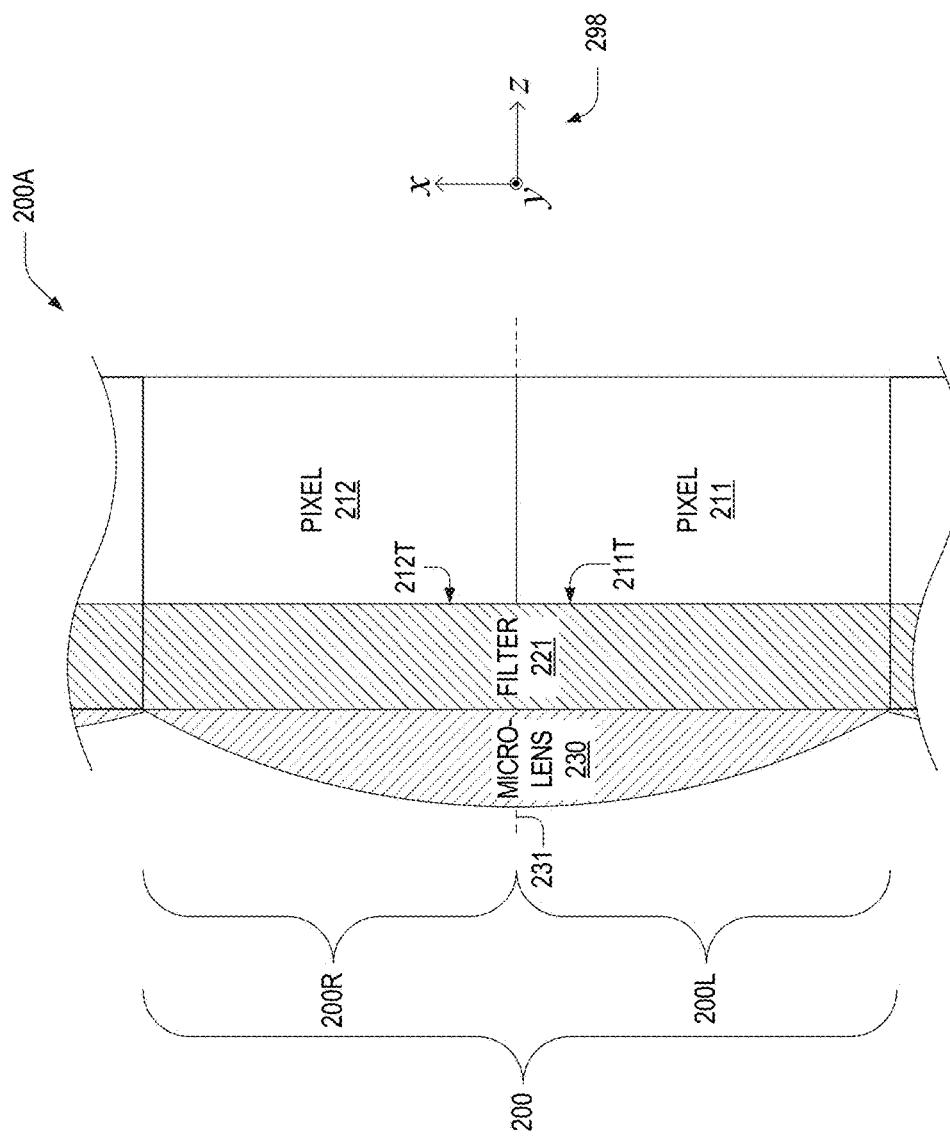
FIG. 2 is a cross-sectional view of a prior-art dual-diode PDAF pixel of the pixel array of FIG. 1.
Figure 3A:
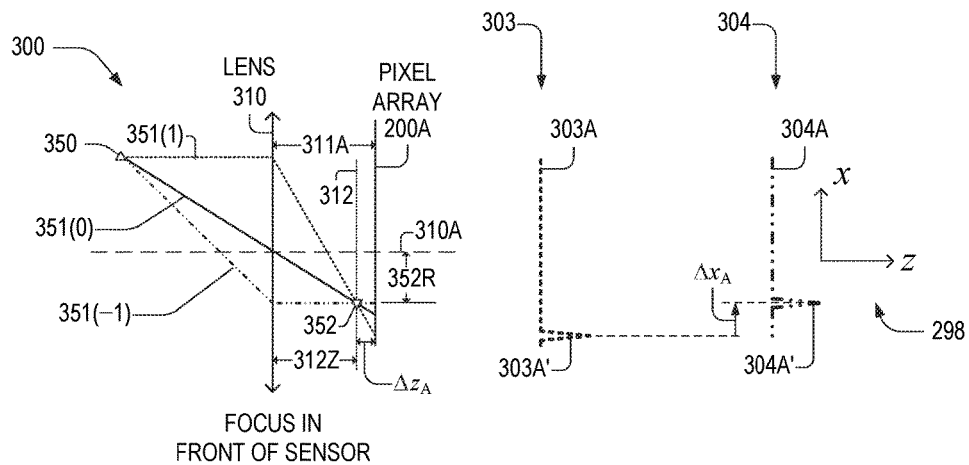
FIGS. 3A-3C are cross-sectional views of a PDAF imaging system in which the pixel array is at different positions with respect to the focal plane.
Figure 3B:
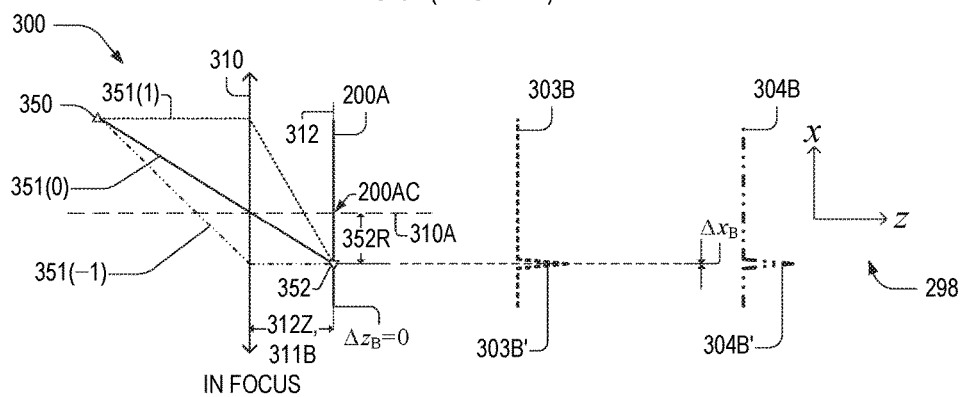
Figure 3C:
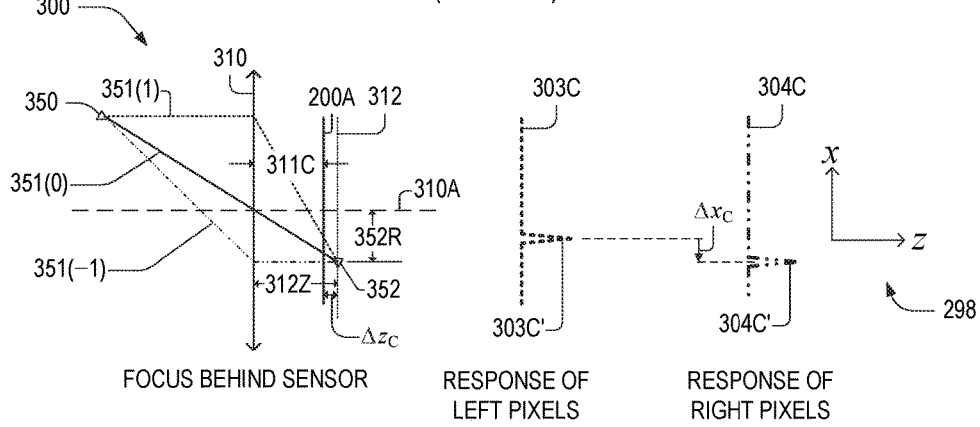

In Eq. (1), distance $d_{pa}$ is a characteristic distance between pixel array 200A and lens 310 along the z-axis of coordinate system 298. Herein, distances from lens 310 are referenced to a principal plane of lens 310, unless noted otherwise. Distances 311A-C of FIG. 3 are examples of distance $d_{pa}$. Distance $d_{pa}$ is for example within a range of image plane distances 312Z between focal plane 312 and lens 310 where image plane distances range from f to an integer multiple of f. Alternatively, $d_{pa}$=f.

In FIG. 5, pixel array 500A is at a focal plane of an imaging system, not shown, that transmits a chief-ray 551(0) and marginal rays 551(±1) thereto. Chief ray 551(0) propagates to a focus 531P and forms an angle $\chi_p$ with optical axis 231. Focus 531P is located a distance 532 from interface 531. Symmetric microlens 230 refracts marginal rays 551 (±1), also propagating at angle $\chi_p$, to a focus 531P where they intersect chief ray 551(0). As focus 531P is within pixel 212 (distance 532 is greater than zero) and rays 551 propagate a longer distance in pixel 212 than they do in pixel 211, pixel 212 has a stronger response to rays 551 than does pixel 211, which is illustrated in FIG. 6.

Figure 6:
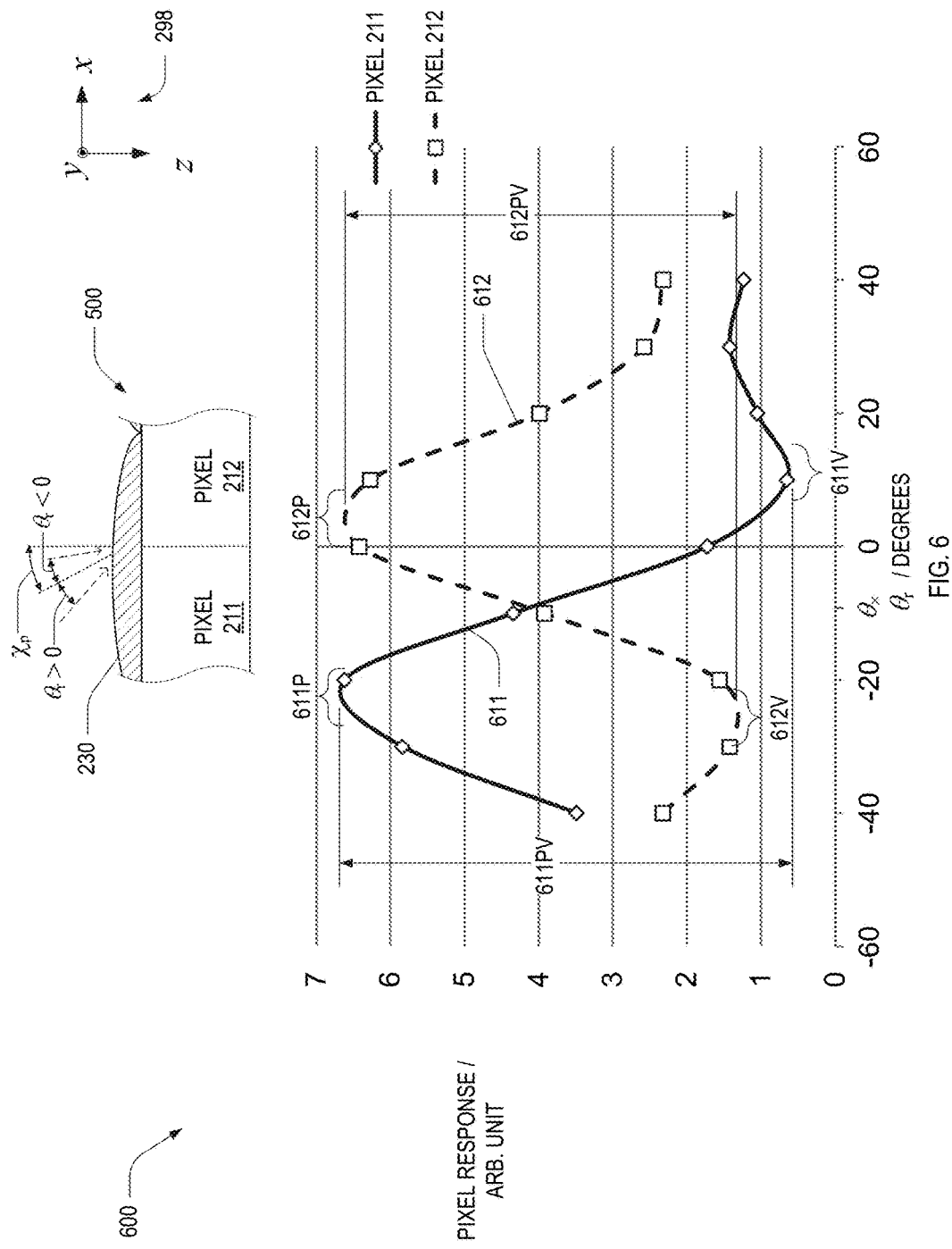
FIG. 6 is a schematic angular selectivity plot of the off-axis multi-diode PDAF pixel of FIG. 5.

FIG. 6 is a schematic angular selectivity plot 600 of PDAF detector 500 showing pixel response as a function of relative CRA $\theta_r$, which is the chief-ray angle of incident light offset by design CRA $\chi_p$. Plot 600 includes pixel response 611 of left pixel 211 and pixel response 612 of right pixel 212. Pixel responses 611 and 612 are equal when angle $\theta_r$ equals a "crossing angle" $\theta_x$, which in this example is $\theta_x \approx -9°$.

Pixel responses 611 and 612 have respective peak regions 611P and 612P that are symmetric about crossing angle $\theta_x$. Pixel responses 611 and 612 also have respective "valley" regions 611V and 612V. The difference in pixel response at peak regions and valley regions is indicative of the pixel's angular sensitivity. In PDAF detector 500, pixels 211-212 have respective peak-to-valley values 611PV and 612PV.

Applicant has determined that PDAF accuracy decreases as crossing angle $\theta_x$ deviates from zero degrees. For PDAF detector 500, crossing angle $\theta_x$ increases with radial distance $r_p$ (e.g., distance 352R, FIG. 3) of the PDAF pixel from the imaging lens optical axis (e.g., optical axis 310A). One cause of crossing angle $\theta_x$ deviating from zero degrees is non-zero distance 532 between focus 531P and interface 531.

Decreasing crossing angle $\theta_x$ may be achieved by modifying symmetric microlens 230 to minimize distance 532, such that pixel responses 611 and 612 are shifted in plot 600 to the right (e.g., by crossing angle $\theta_x$) while maintaining their respective shapes. The shapes of pixel responses 611 and 612 result in part from symmetric microlens 230, which due to its being a focusing lens, imparts a quadratic phase shift (as a function of x and/or y in coordinate system 298) on light transmitted therethrough. The positions of pixel responses 611 and 612, e.g., with respect to $\theta_r$=0, is determined at least partially by any linear phase shift (as a function of x and/or y in coordinate system 298) imparted by symmetric microlens 230 on incident light. As a symmetric lens, symmetric microlens 230 does not impart any such linear phase shift. The simplest optical element that imparts a linear phase is a prism, which is asymmetric and imparts only a linear phase shift on light transmitted therethrough. FIGS. 7-13 illustrate exemplary PDAF detectors with microlenses that impart phase shift with a linear component.

Figure 7:
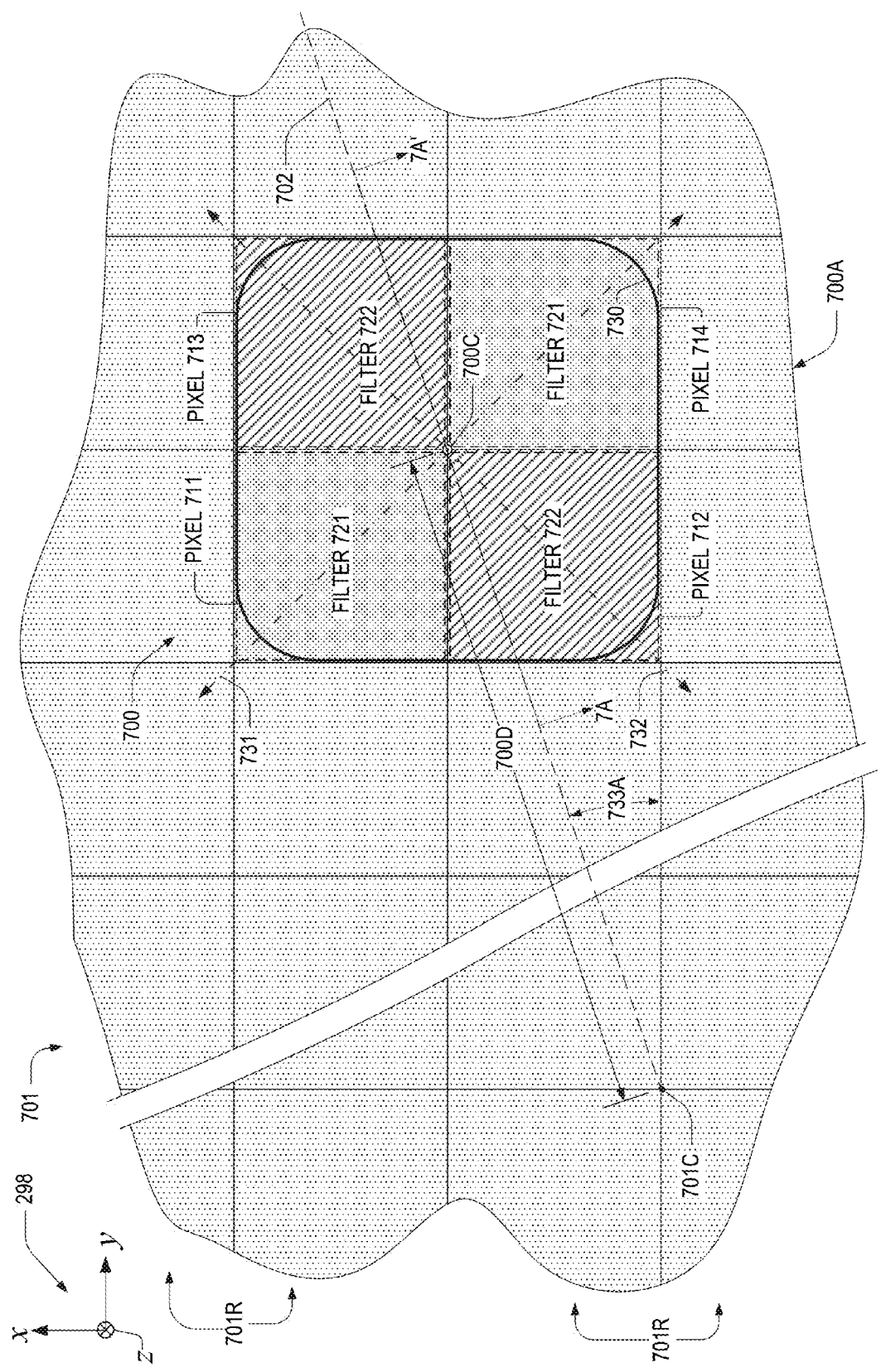
FIG. 7 is a plan view of an image sensor with an asymmetric-microlens PDAF detector, in an embodiment.

FIG. 7 is a plan view of an asymmetric-microlens PDAF detector 700 of an image sensor 701 that is capable of replacing image sensor 101 in digital camera 180. PDAF detector 700 is within a pixel array 700A of image sensor 701. PDAF detector 700 includes an asymmetric microlens 730 above phase-detection pixels 711-714 each having either a color filter 721 or 722 thereon. For clarity of illustration, the dashed boxes denoting pixels 711-714 are smaller than boxes denoting respective color filters 721 and 722.

Image sensor 701 has a plurality of rows 701R. A line 702 between detector-center 700C and pixel-array center 701C forms an angle 733A with respect to a line parallel to rows 701R and including pixel-array center 701C. Detector-center 700C is located at a distance 700D from pixel-array center 701C.

Color filters 721 and 722 each transmit a specified range or ranges of visible electromagnetic radiation to its associated underlying pixel. For example, visible color filters based on primary colors have pass bands corresponding to the red, green, or blue (RGB) region of the electromagnetic spectrum, and are referred to as red filters, green filters, and blue filters respectively. Visible color filters based on secondary colors have pass bands corresponding to combinations of primary colors, resulting in filters that transmit either cyan, magenta, or yellow (CMY) light, and are referred to as cyan filters, magenta filters, and yellow filters, respectively. A panchromatic color filter (Cl) transmits all colors of visible light equally. Since the transmission spectrum of a pixel's color filter distinguishes it from its neighboring pixels, a pixel is referred to by its filter type, for example, a "red pixel" includes a red filter. Herein, the transmission of a pixel refers to the transmission spectrum of its color filter.

Symmetry planes 731 and 732 may be perpendicular to each other and intersect each other at a detector-center 700C. Color filters 721 and 722 have reflection symmetry with respect to both symmetry planes 731 and 732. Symmetric multi-pixel phase-difference detector 700 also has two-fold rotational symmetry. Table 1 shows fourteen exemplary color filter configurations of symmetric multi-pixel phase-difference detectors 700, where R, G, B, C, M, Y, and Cl denote red, green, blue, cyan, magenta, yellow, and panchromatic color filters respectively. In any of the fourteen configurations, the two color filters may be switched without departing from the scope hereof. For example, in configuration (c), color filter 721 is a green filter and color filter 722 is a red filter.

TABLE 1

Exemplary color filter configurations of asymmetric-microlens PDAF detector 700

| filter configuration | (a) | (b) | (c) | (d) | (e) | (f) | (g) | (h) | (i) | (j) | (k) | (l) | (m) | (n) |
|---|---|---|---|---|---|---|---|---|---|---|---|---|---|---|
| color filter 721 | G | Cl | G | G | Cl | Cl | Cl | R | C | C | M | Cl | Cl | Cl |
| color filter 722 | G | Cl | R | B | R | G | B | B | Y | M | Y | C | M | Y |

While asymmetric microlens 730 is shown to not completely cover pixels 711-714 in the plan view of FIG. 5, it may have a differently-shaped cross-section without departing from the scope hereof. For example, asymmetric microlens 730 may have a rectangular perimeter in a plane parallel to the x-y plane of coordinate system 298 such that it completely covers pixels 711-714. Asymmetric microlens 730 may include a portion of at least one of a spherical surface, an ellipsoidal surface, and an aspheric surface. Asymmetric microlens 730 may be formed of a positive photoresist.

Figure 8:
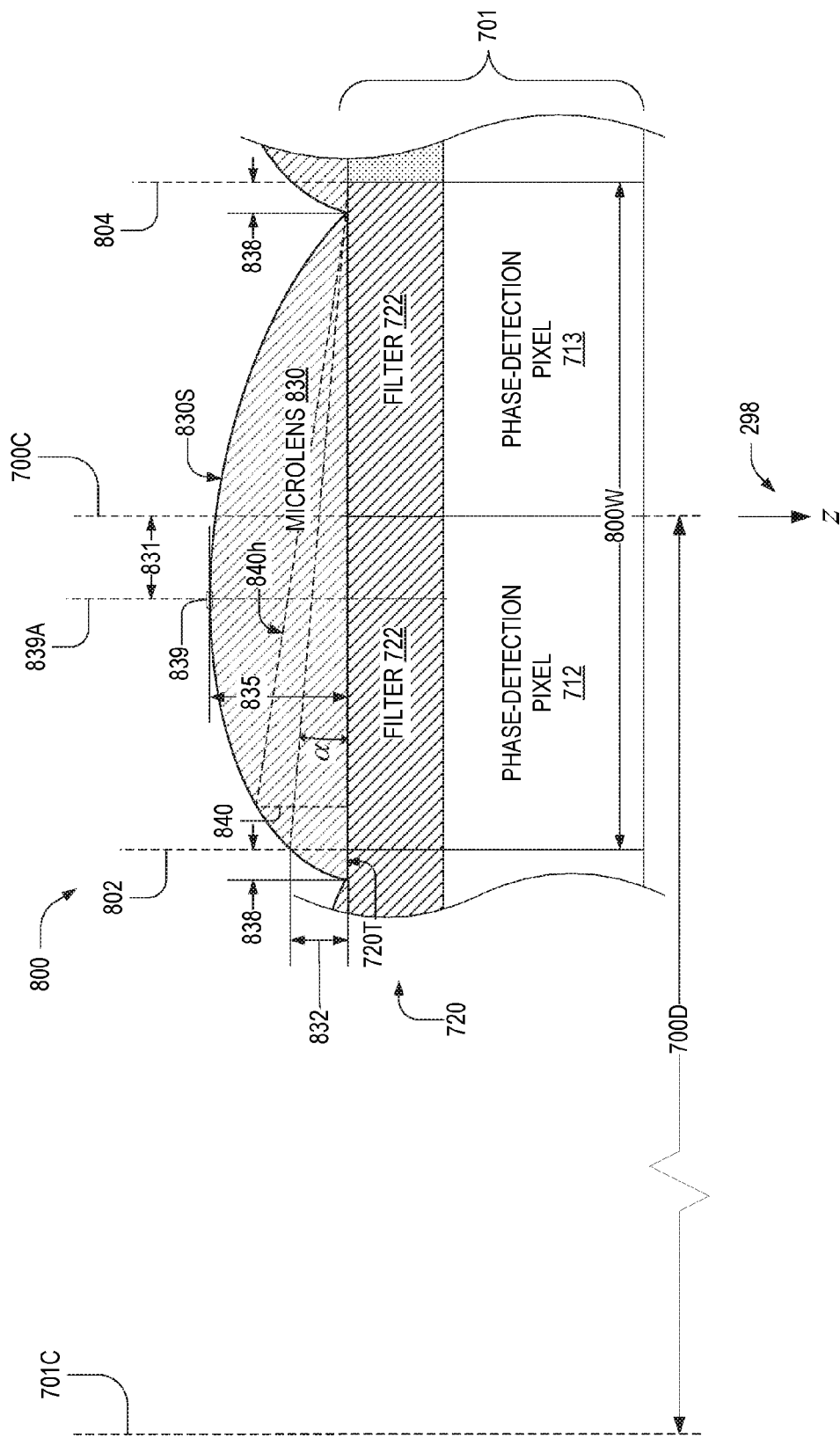
FIG. 8 is a cross-sectional view of the image sensor of FIG. 7 with a first asymmetric-microlens PDAF detector, in an embodiment.
Figure 9:
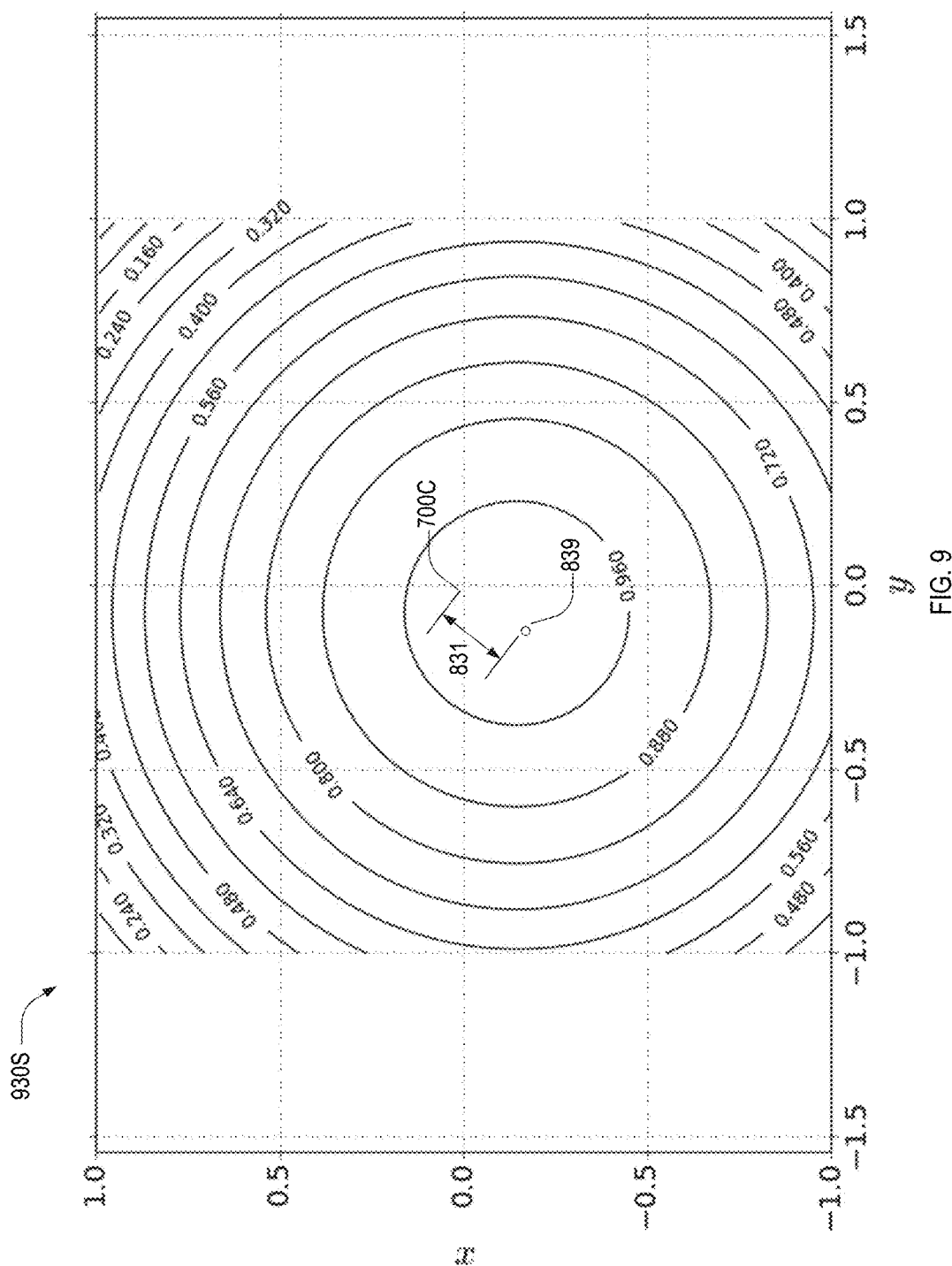
FIG. 9 is a contour plot of an exemplary first asymmetric-microlens PDAF detector of FIG. 8.

FIG. 8 is a cross-sectional view of an asymmetric-microlens PDAF detector 800 of image sensor 701 in cross-sectional plane 7A-7A' of FIG. 7. Asymmetric-microlens PDAF detector 800 is an example of asymmetric-microlens PDAF detector 700 and includes an asymmetric microlens 830, which is an example of asymmetric microlens 730. Microlens 830 has a non-planar surface 830S and that has a maximum height 835 above filters 721 and 722 at an apex 839 located above pixel 712. Filters 721 and 722 are part of a color-filter array 720. Asymmetric-microlens PDAF detector 800 may include a layer between microlens 830 and color filter array 720. Apex 839 is a local extremum of non-planar surface 830S. FIG. 9 is a plan view contour plot of non-planar surface 930S showing contours of equal height z above color filters 721 and 722. Non-planar surface 930S is an example of non-planar surface 830S. FIGS. 8 and 9 are best viewed together in the following description.

Cross-sectional plane 7A-7A' is orthogonal to the x-y plane of coordinate system 298, includes detector-center 700C, and forms angle 733A with pixel-array center 701C. Asymmetric microlens 830 extends a distance 838 past pixel 712 toward pixel-array center 701C. Distance 838 may equal zero without departing from the scope hereof.

FIG. 8 includes a cross-section of a hypothetical prism 840 superimposed on microlens 830. Triangular prism 840 has a planar inclined surface 840h. Microlens 830 may be viewed as including prism 840 with a hypothetical plano-convex lens on planar inclined surface 840h. The hypothetical plano-convex lens corresponds to the region of microlens 830 bound by surface 840h and surface 830S. The region of microlens 830 bound by hypothetical prism 840 imparts the aforementioned linear phase shift for decreasing crossing angle $\theta_x$.

Apex 839 is located at a distance 831 from detector center 700C. Microlens 830 is rotationally asymmetric about an axis 839A that intersects apex 839 and is perpendicular to a top surface 720T of color filter array 720.

Distance 831(i) is one indicator of the asymmetry of microlens 830. In an embodiment, image sensor 701 has a plurality of asymmetric-microlens PDAF detectors 800(i), where i=1, 2, . . . with respective detector centers 700C(i) located at a respective distances 700D(i) from pixel-array center 701C. Each PDAF detector 800(i) has a respective microlens 830(i) and surface 830S(i) having an apex 839(i) located at a respective distance 831(i) from pixel-array center 701C. Distance 831(i) is for example a monotonically increasing function of distance 700D(i). The shape of each surface 830S(i) is for example designed such that each microlens 830(i) focuses a chief-ray incident thereon on detector center 700C(i).

A second indicator of the asymmetry of microlens 830 is its tilt in cross-sectional plane 7A-7A', as indicated by the height difference of microlens 830 at opposite sides of PDAF detector 800. PDAF detector 800 includes an inner side 802 and an outer side 804. Microlens 830 has an inner height 832 at inner edge 802 and an outer height 834 equal to zero (and hence not shown) at outer edge 804. Microlens 830 has a cross-sectional width 800W in cross-sectional plane 7A-7A. Heights 832 and 834 and width 800W determine a microlens tilt angle α. In an embodiment, image sensor 701 has a plurality of asymmetric-microlens PDAF detectors 800(i), where i=1, 2, . . . with respective detector centers 700C(i) located at a respective distances 700D(i) from pixel-array center 701C. Each PDAF detector 800(i) also has a respective microlens tilt angle α(i) that is a monotonically increasing function of distance 700D(i).

Figure 10:
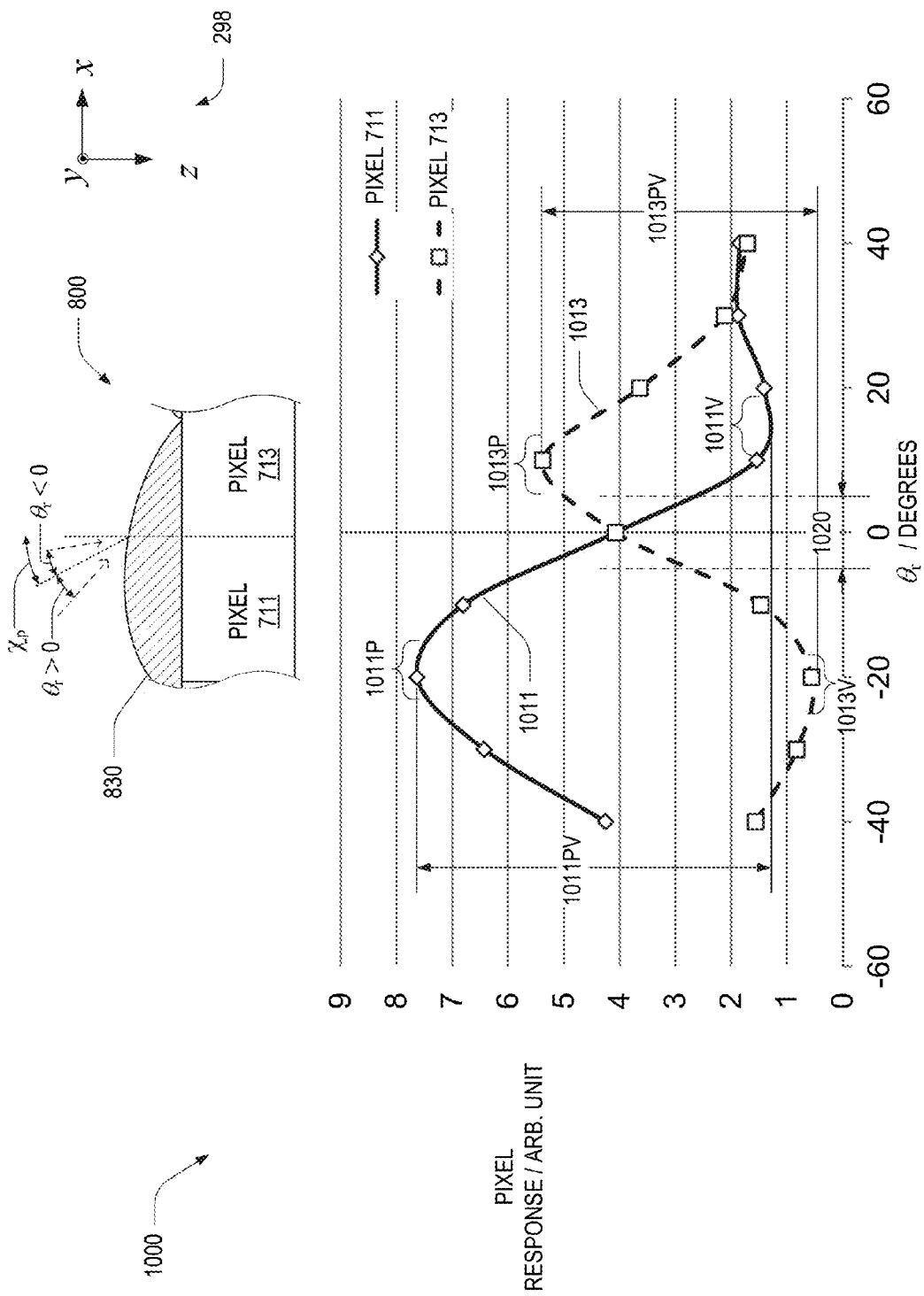
FIG. 10 is a schematic angular selectivity plot of the off-axis multi-diode PDAF pixel of FIG. 8.

FIG. 10 is a schematic angular selectivity plot 1000 of PDAF detector 800 showing pixel response as a function of relative CRA $\theta_r$. Plot 1000 includes pixel response 1011 of pixel 711 and pixel response 1013 of pixel 713. Pixel responses 1011 and 1013 are equal at a value of $\theta_r$ within an angular range 1020 that includes $\theta_r$=0. As pixel responses 1011 and 1013 are respective attributes of pixels 711 and 713 of PDAF detector 800, crossing angle $\theta_x$ is an attribute of PDAF detector 800. Angular range 1020 is for example ±4° about $\theta_r$=0. Angular range 1020 may be larger, for example, ±8° or ±18° about $\theta_r$=0.

Pixel responses 1011 and 1013 have respective peak regions 1011P and 1013P and respective "valley" regions 1011V and 1013V. The difference in pixel response at peak regions and valley regions is indicative of the pixel's angular sensitivity. In PDAF detector 800, pixels 711 and 713 have respective peak-to-valley values 1011PV and 1013PV. Peak-to-valley values 1011PV and 1013PV are less than peak-to-valley values 611PV and 612PV respectively, which indicates that decreasing crossing angle $\theta_x$, while beneficial, results in decreased angular sensitivity of pixels in PDAF detector.

Figure 11:
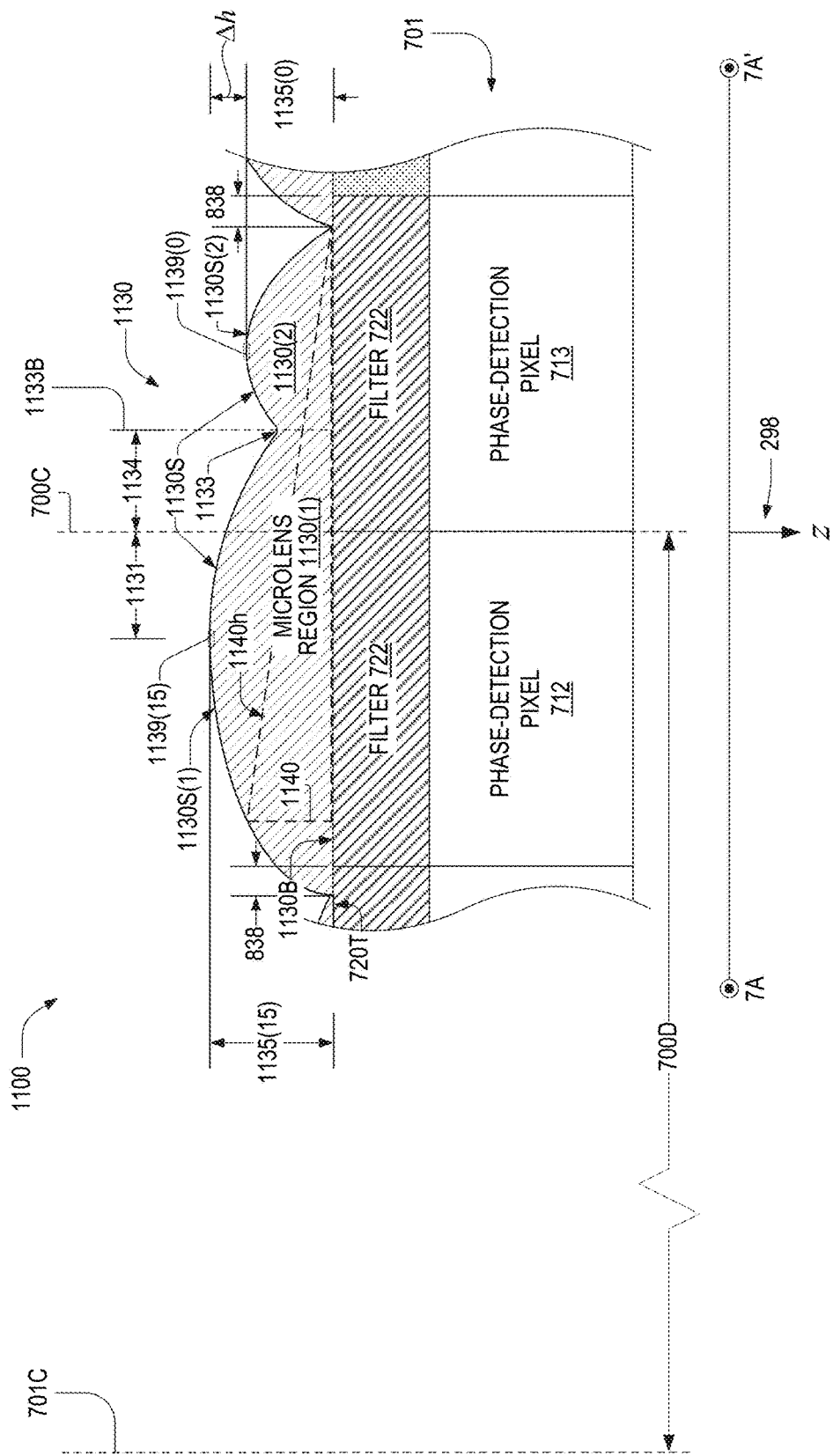
FIG. 11 is a cross-sectional view of the image sensor of FIG. 7 with a second asymmetric-microlens PDAF detector, in an embodiment.

Such decreased angular sensitivity may be overcome by adding degrees of freedom to the microlens of an asymmetric-microlens PDAF detector. For example, FIG. 11 is a cross-sectional view of an asymmetric-microlens PDAF detector 1100 of image sensor 701 along cross-sectional plane 7A-7A' of FIG. 7. Asymmetric-microlens PDAF detector 1100 is an example of asymmetric-microlens PDAF detector 700 and includes an asymmetric gull-wing microlens 1130, which is an example of asymmetric microlens 730. Asymmetric gull-wing microlens 1130 is formed of a positive photoresist having a glass transition temperature $T_g$ between $T_{min}$=140° C. and $T_{max}$=180° C., which enables reflow behavior that is sufficiently stable to form asymmetric gull-wing microlens 1130.

Figure 12:
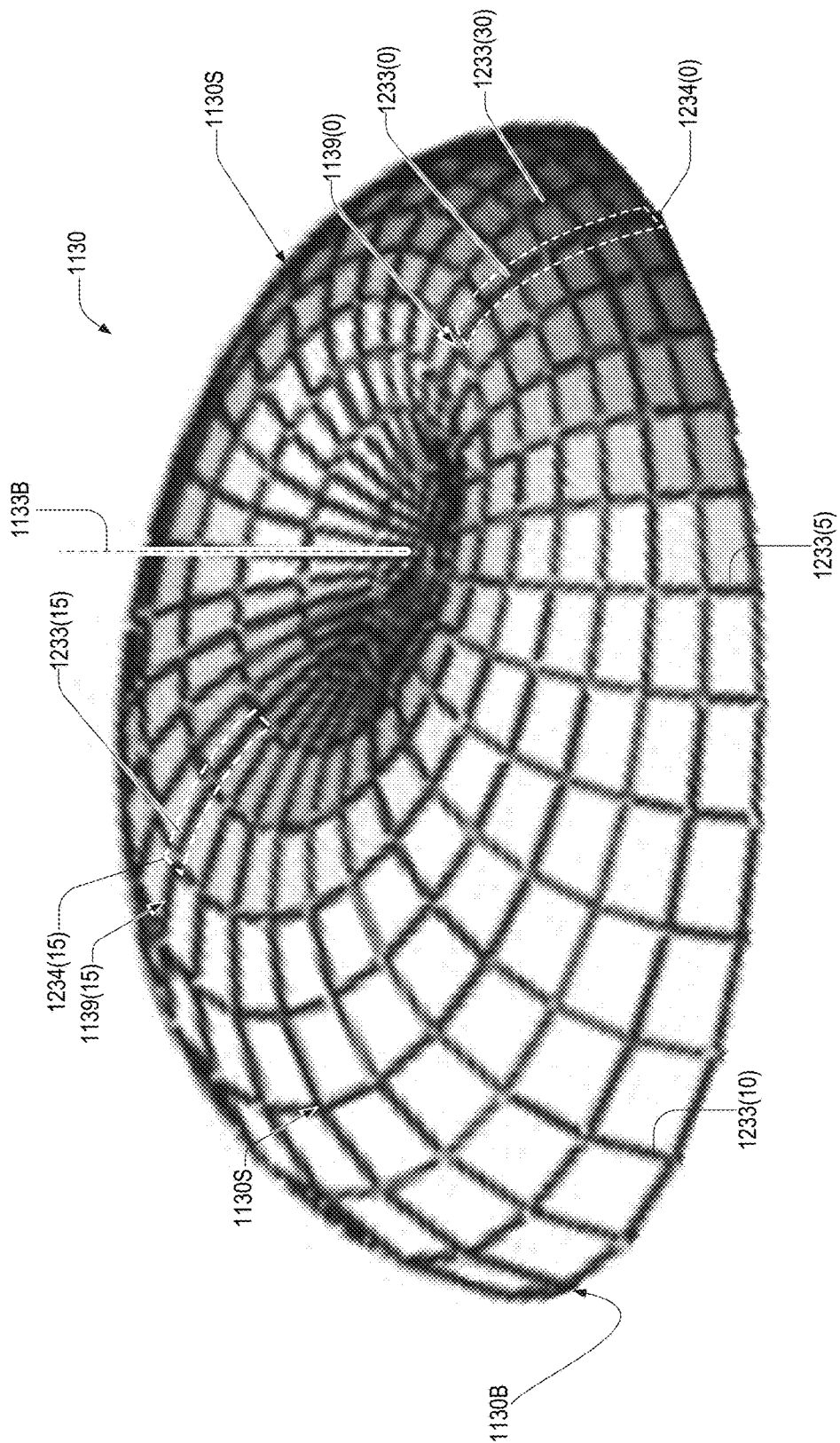
FIG. 12 is a perspective view of the microlens of the second asymmetric-microlens PDAF detector of FIG. 11, in an embodiment.

Asymmetric gull-wing microlens 1130 is asymmetric about detector-center 700C between pixels 711 and 713. Asymmetric gull-wing microlens 1130 extends distance 838 past pixel 711 toward pixel-array center 701C. FIG. 12 is a perspective view of asymmetric gull-wing microlens 1130. FIGS. 11 and 12 are best viewed together in the following description.

Asymmetric gull-wing microlens 1130 has a planar bottom surface 1130B and a non-planar top surface 1130S. Non-planar surface 1130S includes a local minimum 1133 intersected by axis 1133B about which asymmetric gull-wing microlens 1130 is rotationally asymmetric. Asymmetric gull-wing microlens 1130 is also rotationally asymmetric about an axis perpendicular to top surface 720T and through either local maxima 1139(0) and 1139(15) of non-planar top surface 1130S.

Axis 1133B denotes a boundary at a concave region of asymmetric gull-wing microlens 1130 between two convex regions of asymmetric gull-wing microlens 1130: microlens region 1130(1) and 1130(2). Microlens region 1130(1) and 1130(2) have respective surface regions 1130S(1) and surface region 1130S(2) of top surface 1130S. Axis 1133B may be located such that microlens regions 1130(1) and 1130(2) have equal widths in cross-section 7A-7A'. Surface regions 1130S(1) and 1130S(2) have respective local maxima 1139(15) and 1139(0) located above phase-detection pixels 712 and 713 respectively, as denoted in both FIGS. 11 and 12. Local maxima 1139(0) and 1139(15) have respective heights 1135(0) and 1135(15) above bottom surface 1130B, which differ by a height difference Δh that may equal zero without departing from the scope hereof. Local maxima 1139(0) and 1139(15) may be above the same phase-detection pixel without departing from the scope hereof. Local maxima 1139(0) and 1139(15) and local minimum 1133 are local extrema of top surface 1130S.

Asymmetric gull-wing microlens 1130 may be symmetric about cross-sectional plane 7A-7A', which intersects local maxima 1139(15) and 1139(0) as shown in FIG. 11. FIG. 12 illustrates such symmetry, where cross-sectional plane 7A-7A' intersects axis 1133B and portions of top surface 1130S within dashed boxes 1234(15) and 1234(0). Asymmetric gull-wing microlens 1130 may have a surface corresponding to part of a Dupin cyclide, specifically a ring cyclide, as illustrated in FIG. 12.

Local maximum 1139(15) and local minimum 1133 are located at respective distances 1131 and 1134 from detector center 700C. In an embodiment, image sensor 701 has a plurality of asymmetric-microlens PDAF detectors 1100(i), where i=1, 2, . . . with respective detector centers 700C(i) located at a respective distances 700D(i) from pixel-array center 701C. Each PDAF detector 1100(i) has a respective asymmetric gull-wing microlens 1130(i) with a local minimum 1139(i) located at a respective distance 1131(i) from pixel-array center 701C. Each asymmetric gull-wing microlens 1130(i) also has a respective local minimum 1133(i) located at a respective distance 1134(i) from pixel-array center 701C. Distances 1131(i) and 1134(i) are for example a monotonically increasing function of distance 700D(i).

Distance 1134(i) may equal zero, for example, in an asymmetric gull-wing microlens 1130 on a PDAF detectors 1100 close to pixel-array center 701C, such that asymmetric gull-wing microlens 1130 has at least one of (a) Δh=0, and (b) a surface similar to a top surface of a ring torus, a horn torus, or a spindle torus. When both (a) and (b) apply, such an asymmetric gull-wing microlens 1130 is rotationally symmetric about its axis 1133B, and hence is only nominally "asymmetric." PDAF detectors 1100 close to pixel-array center 701C are for example those that include only pixels of pixel array 700A closer to pixel-array center 701C than ninety percent of all pixels of pixel array 700A.

FIG. 12 includes radial lines 1233 on top surface 1130S originating from axis 1133B. For example, dashed box 1234(0) includes radial line 1233(0) and dashed box 1234(15) includes radial line 1233(15). Each radial line is oriented at an angle about axis 1133B with respect to radial line 1233(0). For example, radial line 1233(15) is 180° from radial line 1233(0). For clarity of illustration, not all radial lines 1233 are illustrated in FIG. 12. Each radial line 1233(0-30) on top surface 1130S includes a respective local maximum 1139(0-30) at a respective lens height 1135(0-30) above planar bottom surface 1130B. For example, local maxima 1139(15) and 1139(0) are at maximum height above planar bottom surface 1130B on their respective radial lines 1233(0) and 1233(15). Of local maxima 1139(0-30), local maximum 1139(15) is the largest and local maximum 1139(0) is the smallest.

Figure 13:
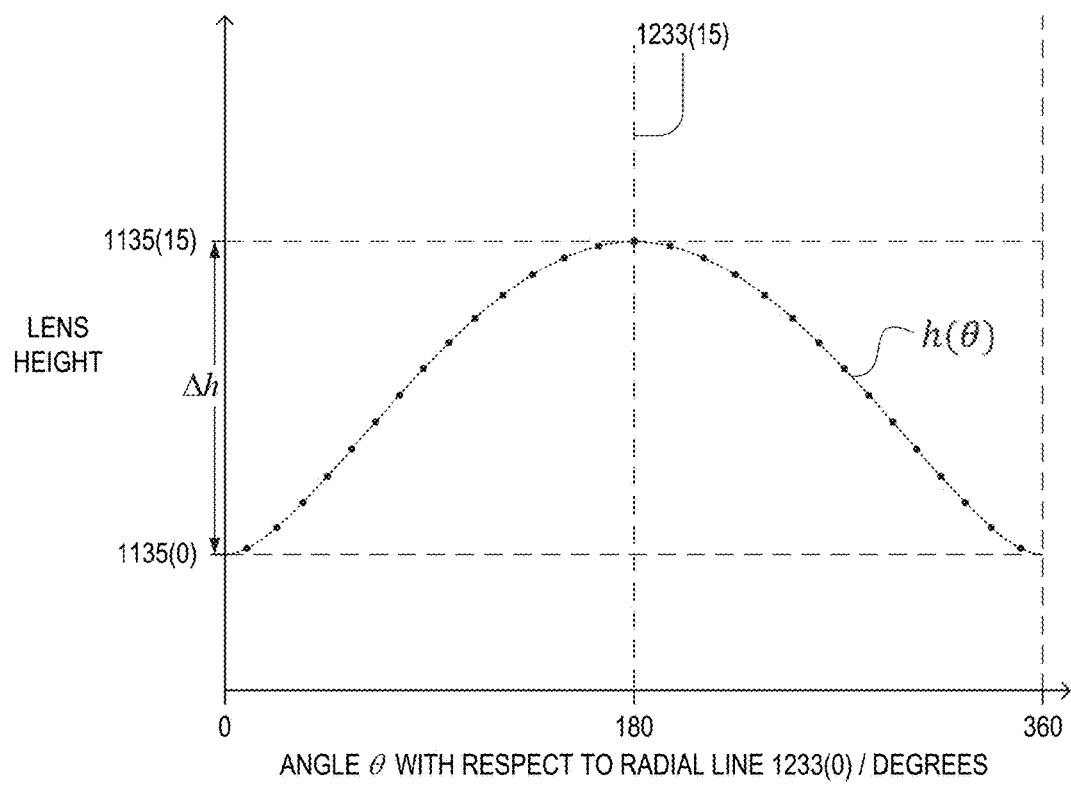
FIG. 13 is a schematic interpolated curve h(θ) representing of exemplary values of lens heights of the microlens of FIG. 12.

FIG. 13 is a schematic interpolated curve h(θ) representing of exemplary values of lens heights 1135 of local maxima 1139 as a function of the angle θ of their respective radial lines 1233. Since θ=0° and θ=360° correspond to the same position on top surface 1130S, h(0)=h(360°) and h'(0)=h'(360°) where $$h'(\theta) = \frac{dh}{d\theta}.$$

While curve h(θ) is symmetric about θ=360°, it may be asymmetric about θ=360° without departing from the scope hereof.

Whereas microlens 830, in cross-section, may be viewed as a single hypothetical plano-convex lens on top of a prism, microlens 1130, in cross-section, may be viewed as two plano-convex lenses on top of a prism. FIG. 11 includes a cross-section of a triangular prism 1140 superimposed on asymmetric gull-wing microlens 1130. Triangular prism 1140 has a planar inclined surface 1140h. The first hypothetical lens includes a portion of microlens region 1130(1) between surface 1140h and surface region 1130S(1). The second hypothetical lens includes a portion of microlens region 1130(2) between surface 1140h and surface region 1130S(2).

Surface regions 1130S(1,2) have respective best-fit radii of curvature $R_1$ and $R_2$ such that microlens regions 1130(1,2) may have different respective focal lengths $f_1$ and $f_2$ determined by $R_1$ and $R_2$, respectively, and the refractive index of asymmetric gull-wing microlens 1130. Local minimum 1133 and adjacent surface regions 1130S(1, 2) provide asymmetric gull-wing microlens 1130 with additional degrees of freedom, compared to microlens 830, for optimizing pixel responses of pixels 711 and 712 as a function of angle $\theta_r$. For example, while asymmetric gull-wing microlens 1130 may be optimized to impose an appropriate linear phase shift on light transmitted therethrough to decrease crossing angle $\theta_x$ to zero while minimizing a loss in angular sensitivity, for example, such that peak-to-valley values 1011PV and 1013PV are closer to 611PV and 612PV, respectively.

Figure 14:
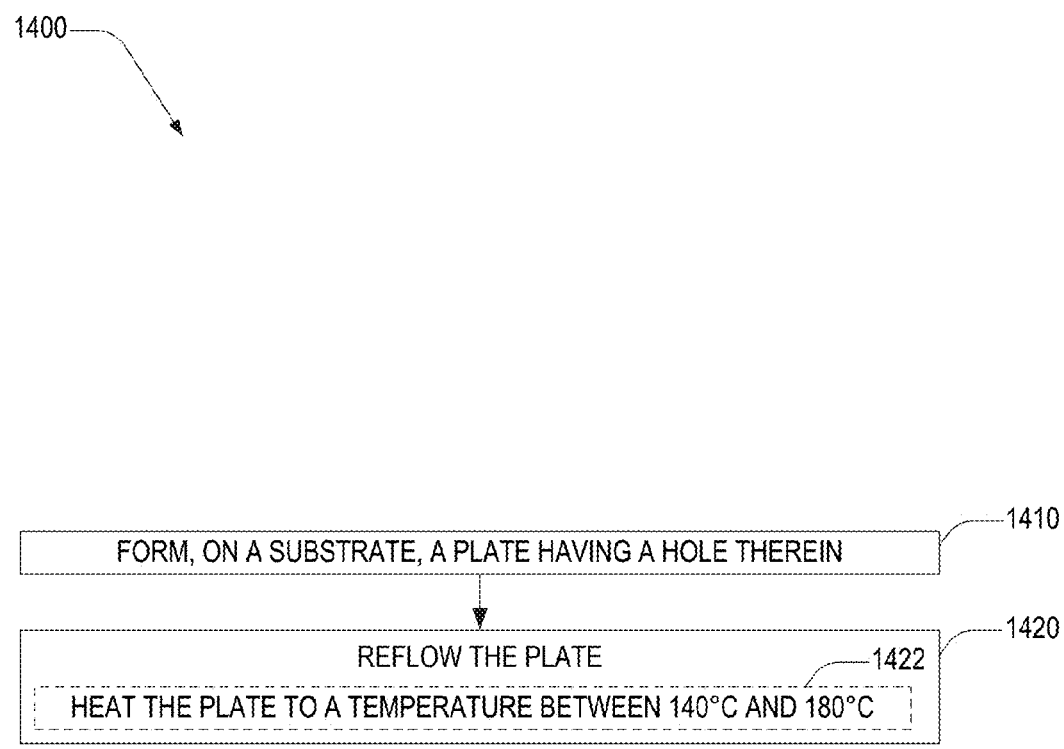
FIG. 14 is a flowchart illustrating an exemplary method for fabricating the asymmetric microlens of FIG. 12, in an embodiment.
Figure 15:
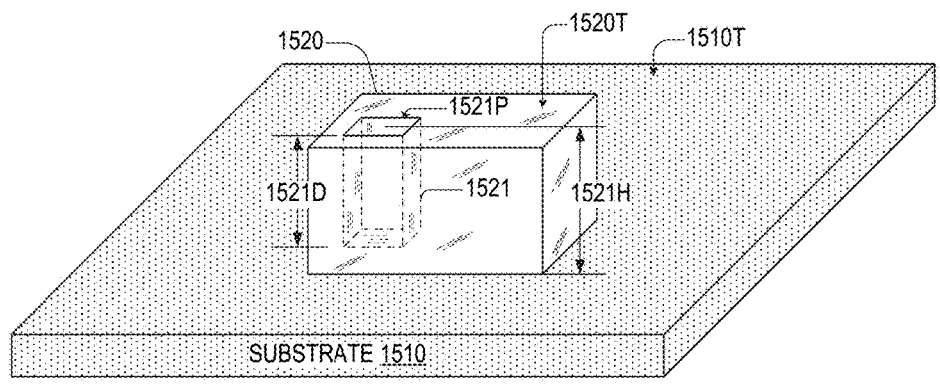
FIG. 15 is a perspective view of a plate formed on a substrate in accordance with the method of FIG. 14, in an embodiment.

FIG. 14 is a flowchart illustrating an exemplary method 1400 for fabricating an asymmetric gull-wing microlens. FIG. 14 illustrates steps of method 1400. FIGS. 14 and 15 are best viewed together with the following description.

In step 1410, method 1400 forms, on a substrate, a plate having a hole therein. The plate may be formed via a photolithography. In an example of step 1410, a plate 1520 is formed on a top surface 1510T of a substrate 1510, as shown in FIG. 15.

Plate 1520 has a top surface 1520T and a hole 1521 therein. Hole 1521 has a perimeter 1521P, the average height of which is located at a height 1521H above substrate top surface 1510T. Hole 1521 extends to a depth 1521D toward substrate 1510. Depth 1521D may extend to top surface 1510T. Hole 1521 is a through hole that exposes a portion of top surface 1510T. Plate top surface 1520T may be planar and parallel to substrate top surface 1510T, for example, to form an asymmetric gull-wing microlens 1130 with Δh=0. Alternatively, at least part of top plate surface 1520T may be a nonparallel to substrate top surface 1510T, for example, to form an asymmetric gull-wing microlens 1130 with Δh≠0, as illustrated in FIGS. 11-13. Such a nonparallel and/or nonplanar top plate surface 1520T is formed for example via photolithography with a mask having spatially-varying transmittance beneath plate top surface 1520T.

Substrate 1510 may be above an image sensor pixel array. For example, substrate 1510 is color-filter array 720 or a layer thereon, plate 1520 covers pixels 711-714 of FIG. 7, and hole 1521 is positioned such that cross-sectional plane 7A-7A' intersects it. In such a case, pixel array-center 701C, detector center 700C, and hole 1521 are collinear. Pixel-array center 701C, detector center 700C, and hole 1521 may be "perfectly" collinear, when a line intersecting array-center 701C and detector center 700C intersects a center axis of hole 1521, rather than any portion of hole 1521.

In step 1420, method 1400 reflows the plate. In an example of step 1420, plate 1520 is reflowed to yield asymmetric gull-wing microlens 1130. Step 1420 may include reflowing the plate with a spatially-varying reflow temperature beneath plate top surface 1520T, and result in asymmetric microlens 1130 with spatially-varying heights 1135(*i*). Plate 1520 is for example formed of a positive photoresist having a glass transition temperature $T_g$ between the aforementioned $T_{min}$ and $T_{max}$, which enables reflow behavior that is sufficiently stable to form asymmetric gull-wing microlens 1130. Accordingly, the reflow of step 1420 may include step 1422, in which the plate is heated to a temperature between $T_{min}$ and $T_{max}$.

Figure 16:
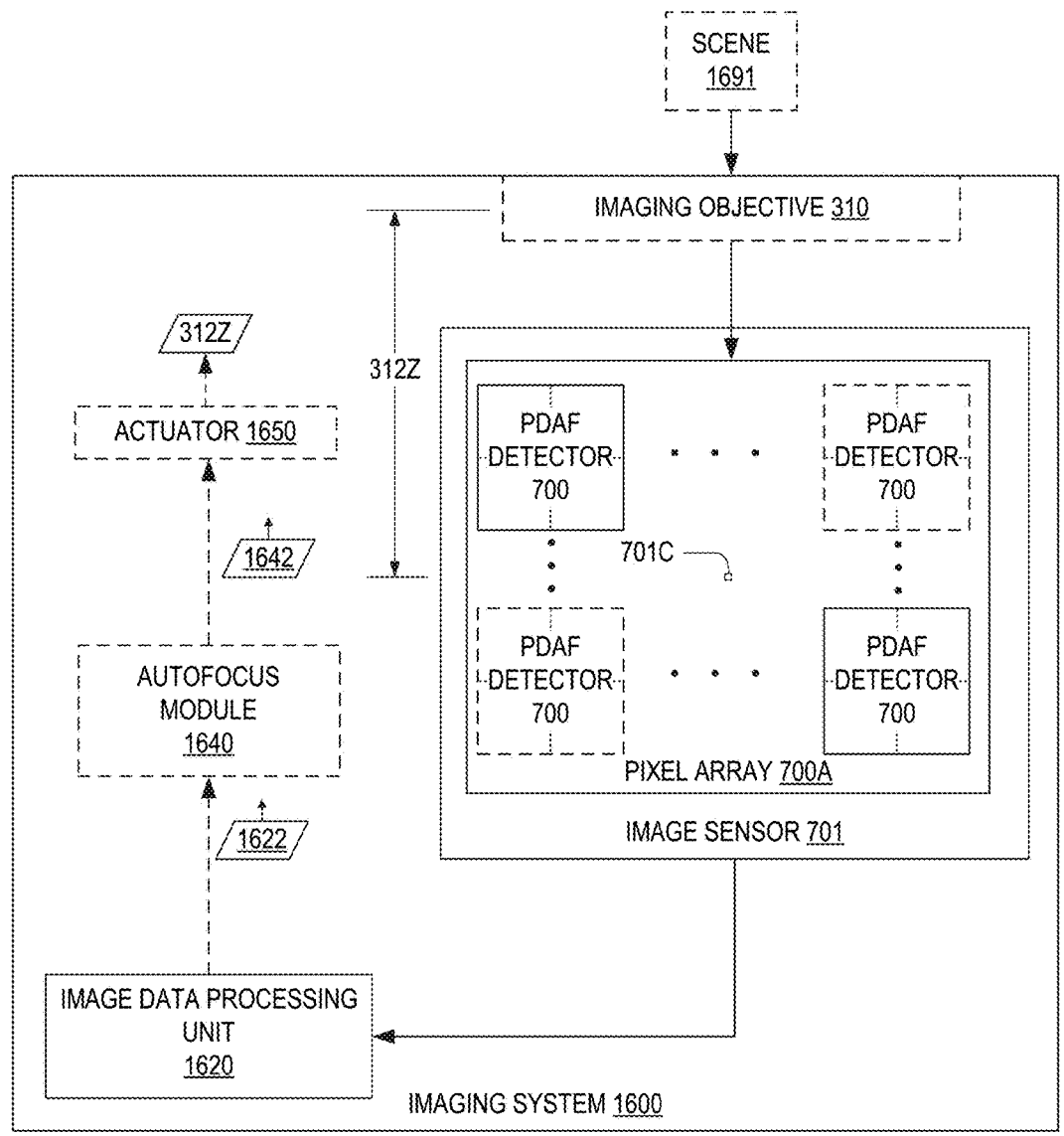
FIG. 16 illustrates an exemplary imaging system, in an embodiment.

FIG. 16 illustrates one exemplary imaging system 1600 with a plurality of asymmetric-microlens PDAF detectors 700 in image sensor 701, an image data processing unit 1620, and optionally an autofocus module 1640 and an actuator 1650. Imaging system 1600 may also include an imaging objective 310 of FIG. 3.

In an exemplary mode of operation, imaging objective 310 form an image of a scene 1691 on image sensor 701. Pixel array 700A and imaging objective are separated by distance 312Z, illustrated in FIG. 3. Scene 1691 includes off-axis object 350 of FIG. 3. PDAF detectors 700 produce electrical signals received by image data processing unit 1620, which therefrom generates PDAF signal 1622. PDAF signal 1622 for example includes one of distances $\Delta x_{\{A,B,C\}}$ of FIG. 3. Autofocus module 1640 receives PDAF signal 1622 and generates misfocus signal 1642, which for example includes one of misfocus distances $\Delta z_{\{A,B,C\}}$ of FIG. 3. Image data processing unit 1620 may include autofocus module 1640, for example, by performing the functions thereof. Imaging system 1600 may also include an actuator 1650 communicatively connected to autofocus module 1640. Actuator 1650 is capable of, in response to receiving misfocus signal 1642, minimizing the magnitude of misfocus Δz by changing distance 312Z.

Combinations of Features

Features described above as well as those claimed below may be combined in various ways without departing from the scope hereof. The following examples illustrate some possible, non-limiting combinations:

(A1) An image sensor includes an asymmetric-microlens PDAF detector. The asymmetric-microlens PDAF detector includes a plurality of pixels and a microlens. The plurality of pixels forms a sub-array having at least two rows and two columns. The microlens is located above each of the plurality of pixels, and is rotationally asymmetric about an axis perpendicular to the sub-array. The axis intersects a local extremum of a top surface of the microlens.

(A2) The image sensor denoted by (A1) is capable of capturing an image formed thereon, and may further include an image data processing unit capable of (i) receiving electrical signals from each of the plurality of pixels, and (ii) outputting data associated with misfocus of the image.

(A3) In an image sensor denoted by one of (A1) and (A2), the first microlens may have, in a cross-sectional plane intersecting the first microlens and perpendicular to a top surface of the first sub-array, a height profile with more than one local maximum (A4) In the image sensor denoted by (A3), the first sub-array may be a two-by-two planar array, the height profile having two local maxima.

(A5) An image sensor denoted by one of (A1) through (A4) may further include a second asymmetric-microlens PDAF detector that has a plurality of second pixels and a second microlens. The second plurality of pixels forms a second sub-array having at least two rows and two columns. The second microlens is located above each of the second plurality of pixels and is rotationally asymmetric about a second axis perpendicular to the second sub-array and intersecting a second local extremum of a top surface of the second microlens. The first and second plurality of pixels are part of a pixel array having a pixel-array top surface and a pixel-array center. The second asymmetric-microlens PDAF detector is further from the pixel-array center than the first asymmetric-microlens PDAF detector. A location on the pixel-array top surface directly beneath the first local extremum is at a first distance from a center of the first sub-array. A location on the pixel-array top surface directly beneath the second local extremum is at a second distance from a center of the second sub-array, the second distance exceeding the first distance.

(A6) In an image sensor denoted by one of (A1) through (A5), in which the first plurality of pixels each have a respective color filter thereon, each color filter having a transmission spectrum, the sub-array, by virtue of the transmission spectrum of each color filter, may have reflection symmetry with respect to a center of the pixel sub-array.

(B1) A PDAF imaging system includes an image sensor and an image data processing unit. The image sensor has an asymmetric-microlens PDAF detector that includes: (a) a plurality of pixels forming a sub-array having at least two rows and two columns, and (b) a microlens located above each of the plurality of pixels and being rotationally asymmetric about an axis perpendicular to the sub-array. The axis intersects a local extremum of a top surface of the microlens. The image data processing unit is capable of receiving electrical signals from each of the plurality of pixels and generating a PDAF signal from the received electrical signals.

(B2) The PDAF imaging system denoted by (B1) may further include an autofocus module capable of receiving the PDAF signal and generating a misfocus signal indicative of a degree of misfocus between the image sensor and an imaging lens that has an optical axis intersecting the image sensor.

(B3) In a PDAF imaging system denoted by one of (B1) and (B2), the first microlens may have, in a cross-sectional plane intersecting the first microlens and perpendicular to a top surface of the first sub-array, a height profile having more than one local maximum.

(B4) In the PDAF imaging system denoted by (B3), the first sub-array may be a two-by-two planar array, and the height profile may have two local maxima.

(B5) A PDAF imaging system denoted by one of (B1) through (B4) may further include the second asymmetric-microlens PDAF detector of the image sensor denoted by (A5).

(B6) In an image sensor denoted by one of (B1) through (B5), in which the first plurality of pixels each have a respective color filter thereon, each color filter having a transmission spectrum, the sub-array, by virtue of the transmission spectrum of each color filter, may have reflection symmetry with respect to a center of the pixel sub-array.

(C1) A method for forming a gull-wing microlens includes forming, on a substrate, a plate having a hole therein. The method also includes reflowing the plate.

(C2) In the method denoted by (C1), the step of reflowing may include heating the plate to a temperature between 140° C. and 180° C.

(C3) In a method denoted by one of (C1) and (C2), the hole may be a through hole (C4) In a method denoted by one of (C1) through (C3), (a) the substrate may be above a pixel array of an image sensor, (b) the plate may cover a two-by-two array of pixels of the pixel array, and (c) the pixel-array center, the hole, and the center of the two-by-two array of pixels may be collinear.

(C5) In a method denoted by one of (C1) through (C4), in which the plate is formed on a surface of the substrate, the plate may have a top surface that is not parallel to the surface of the substrate.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An image sensor with a first asymmetric-microlens phase-detection auto-focus (PDAF) detector, the first asymmetric-microlens PDAF detector comprising:
a first plurality of pixels forming a first sub-array having at least two rows and two columns; and
a first microlens located above each of the first plurality of pixels, and being rotationally asymmetric about an axis perpendicular to the first sub-array, the axis intersecting a first local extremum of a top surface of the first microlens, the first microlens at least partially covering each pixel of the first plurality of pixels and having, in a cross-sectional plane intersecting the first microlens and perpendicular to a top surface of the first sub-array, a height profile having more than one local maximum.

2. The image sensor of claim 1, capable of capturing an image formed thereon, and further comprising an image data processing unit capable of (i) receiving electrical signals from each of the plurality of pixels, and (ii) outputting data associated with misfocus of the image.

3. The image sensor of claim 1, the first sub-array being a two-by-two planar array, the height profile having two local maxima.

4. The image sensor of claim 1, further comprising:
a second asymmetric-microlens PDAF detector including:
a second plurality of pixels forming a second sub-array having at least two rows and two columns, and
a second microlens located above each of the second plurality of pixels and being rotationally asymmetric about a second axis perpendicular to the second sub-array and intersecting a second local extremum of a top surface of the second microlens, the second microlens at least partially covering each pixel of the second plurality of pixels;
the first and second plurality of pixels being part of a pixel array having a pixel-array top surface and a pixel-array center;
the second asymmetric-microlens PDAF detector being further from the pixel-array center than the first asymmetric-microlens PDAF detector;
a location on the pixel-array top surface directly beneath the first local extremum being at a first distance from a center of the first sub-array; and
a location on the pixel-array top surface directly beneath the second local extremum being at a second distance from a center of the second sub-array, the second distance exceeding the first distance.

5. The image sensor of claim 1,
the first plurality of pixels each having a respective color filter thereon, each color filter having a transmission spectrum,
the sub-array, by virtue of the transmission spectrum of each color filter, having reflection symmetry with respect to a center of the pixel sub-array.

6. A phase-detection auto-focus (PDAF) imaging system comprising:
an image sensor having a first asymmetric-microlens PDAF detector that includes:
(a) a first plurality of pixels forming a first sub-array having at least two rows and two columns, and
(b) a first microlens located above each of the plurality of pixels and being rotationally asymmetric about an axis perpendicular to the first sub-array, the axis intersecting a first local extremum of a top surface of the first microlens the first microlens at least partially covering each pixel of the first plurality of pixels and having, in a cross-sectional plane intersecting the first microlens and perpendicular to a top surface of the first sub-array, a height profile having more than one local maximum; and
an image data processing unit capable of receiving electrical signals from each of the plurality of pixels and generating a PDAF signal from the received electrical signals.

7. The PDAF imaging system of claim 6, further comprising an autofocus module capable of receiving the PDAF signal and generating a misfocus signal indicative of a degree of misfocus between the image sensor and an imaging lens that has an optical axis intersecting the image sensor.

8. The PDAF imaging system of claim 6, the first sub-array being a two-by-two planar array, the height profile having two local maxima.

9. The PDAF imaging system of claim 6, further comprising:
- a second asymmetric-microlens PDAF detector including:
  - a second plurality of pixels forming a second sub-array having at least two rows and two columns, and
  - a second microlens located above each of the second plurality of pixels and being rotationally asymmetric about a second axis perpendicular to the second sub-array and intersecting a second local extremum of a top surface of the second microlens, the second microlens at least partially covering each pixel of the second plurality of pixels;
- the first and second plurality of pixels being part of a pixel array having a pixel-array top surface and a pixel-array center;
- the second asymmetric-microlens PDAF detector being further from the pixel-array center than the first asymmetric-microlens PDAF detector;
- a location on the pixel-array top surface directly beneath the first local extremum being at a first distance from a center of the first sub-array;
- a location on the pixel-array top surface directly beneath the second local extremum being at a second distance from a center of the second sub-array, the second distance exceeding the first distance.

10. The PDAF imaging system of claim 6,
- the plurality of pixels each having a respective color filter thereon, each color filter having a transmission spectrum,
- the sub-array, by virtue of each transmission spectrum, having reflection symmetry with respect to a center of the pixel sub-array.

* * * * *